UNITED STATES PATENT OFFICE.

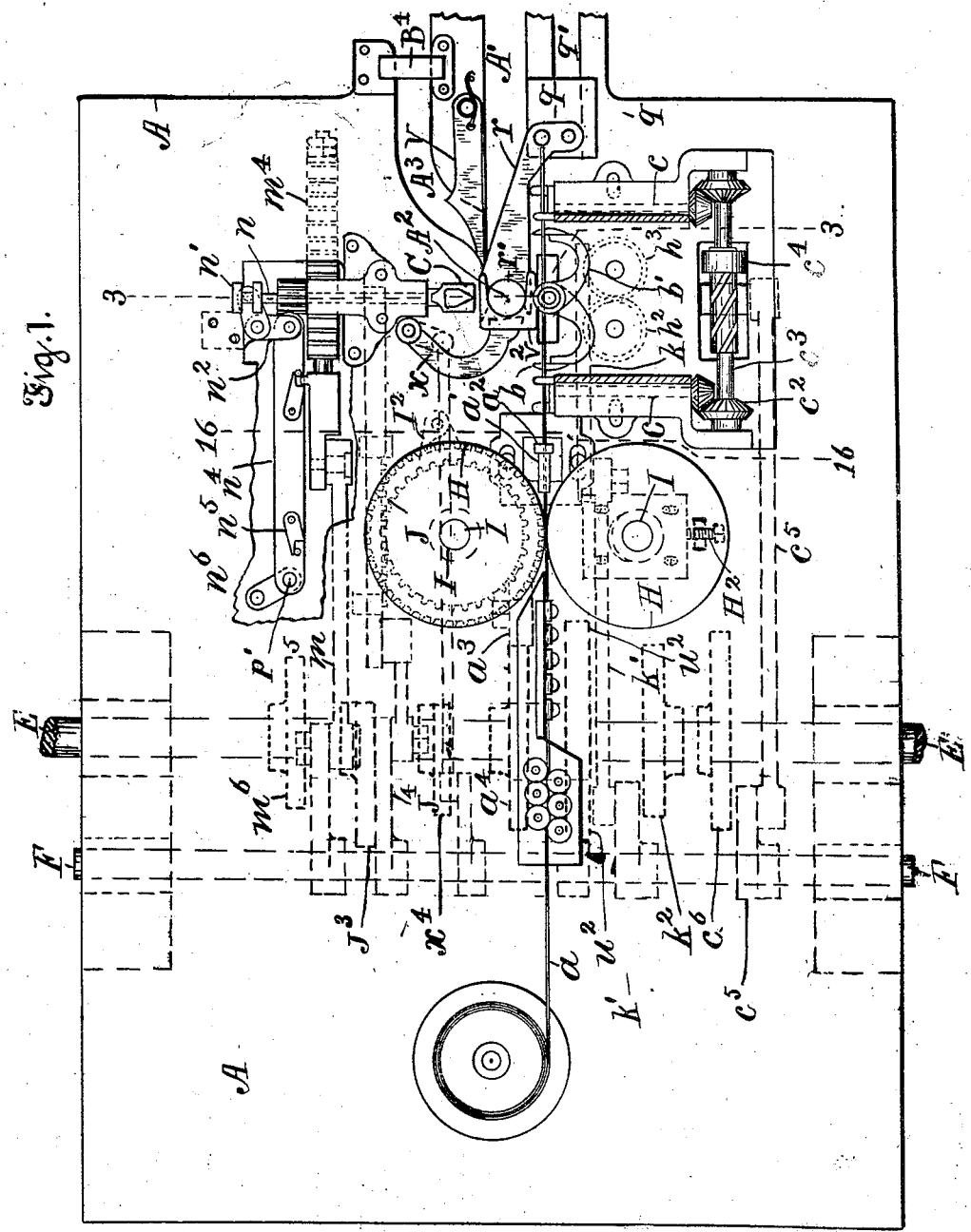

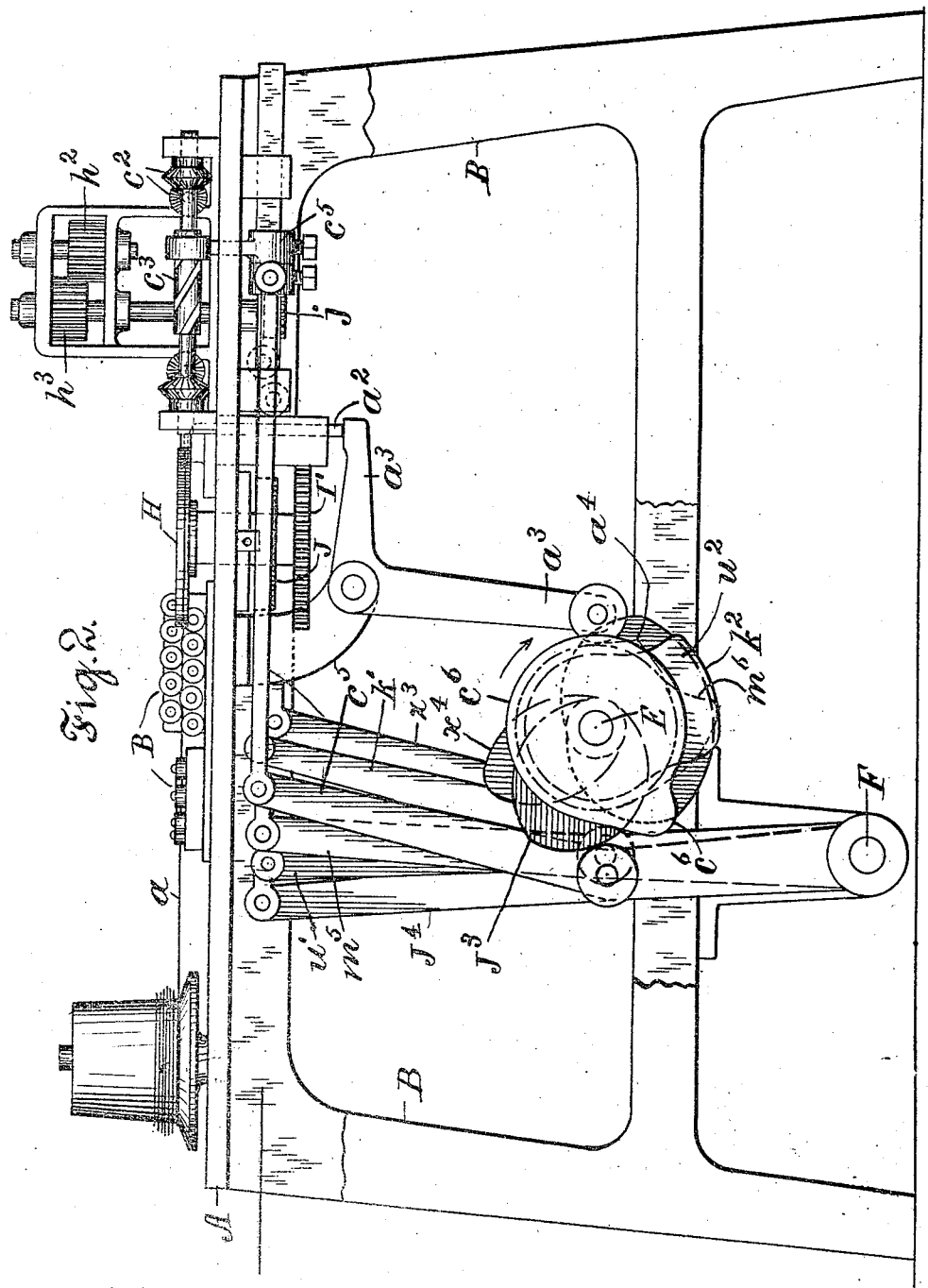

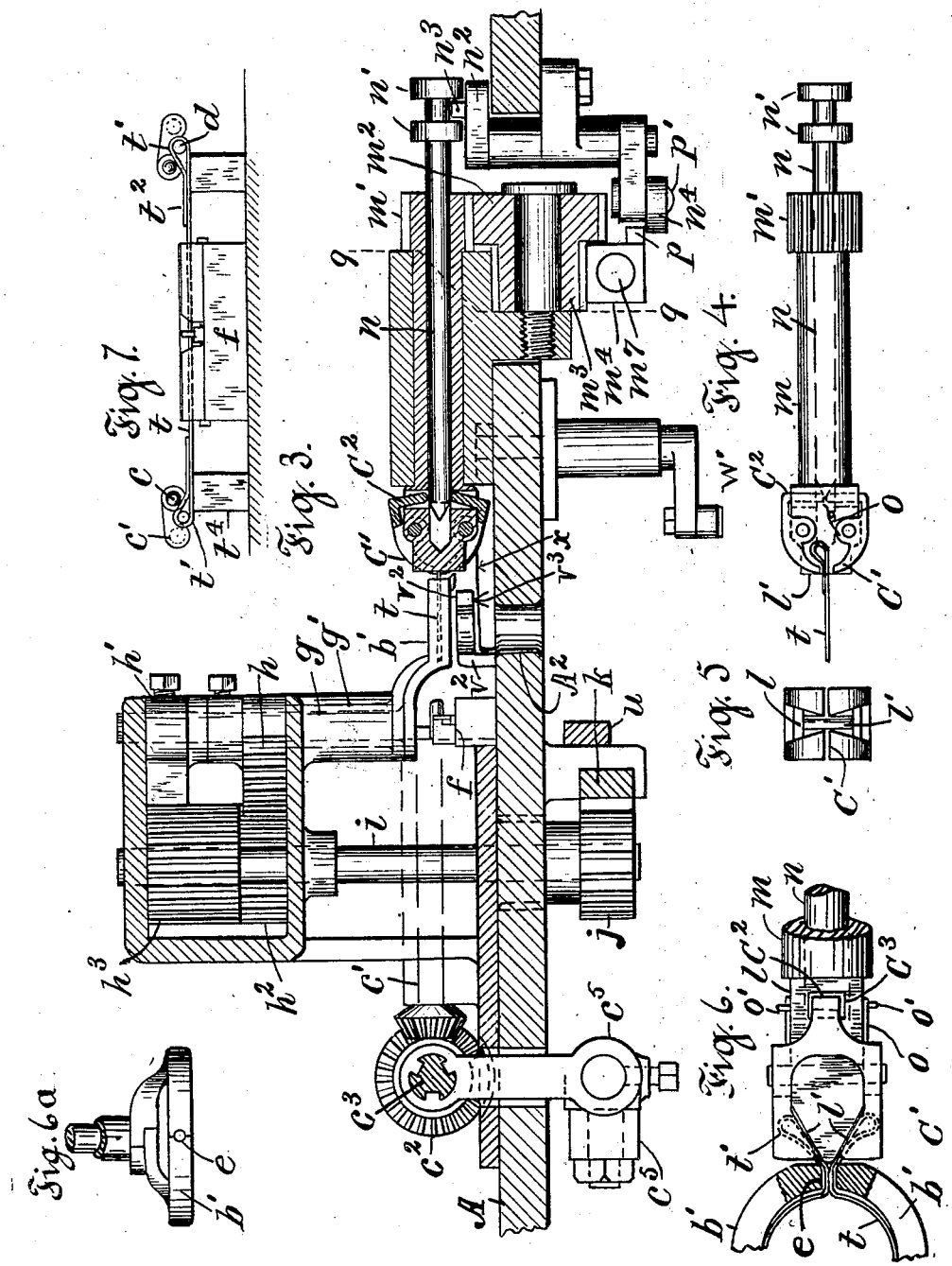

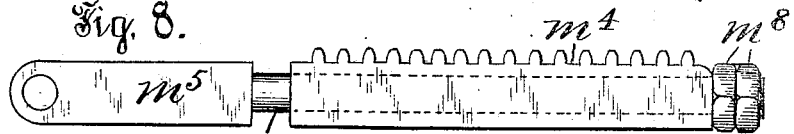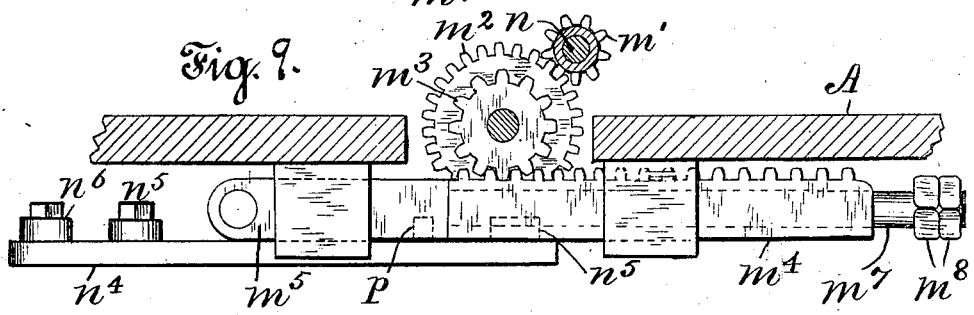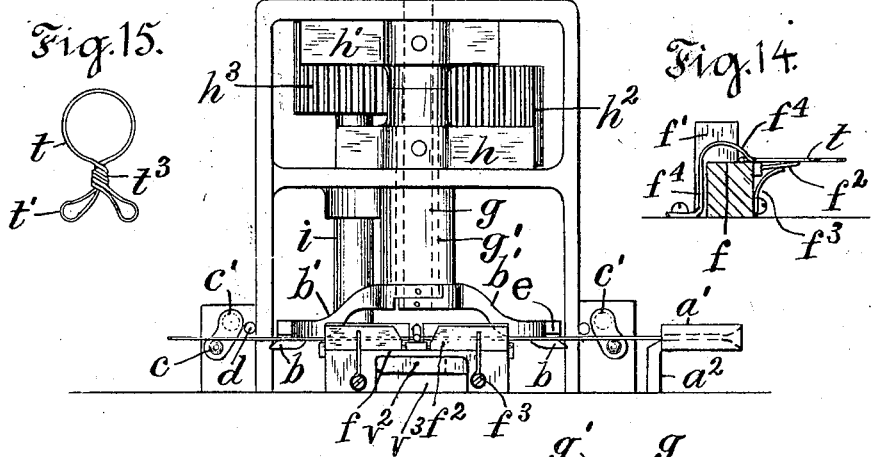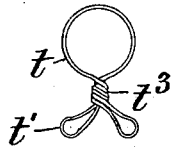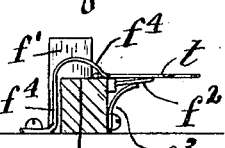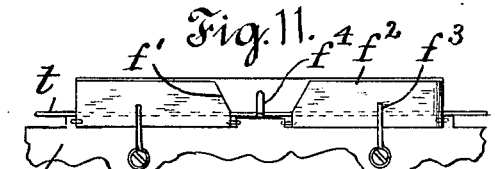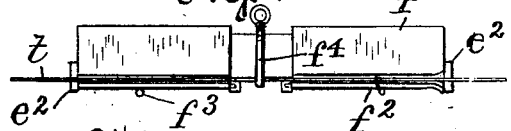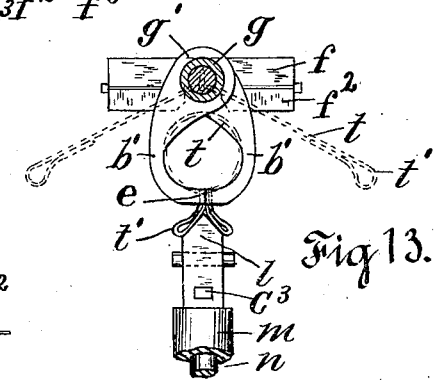

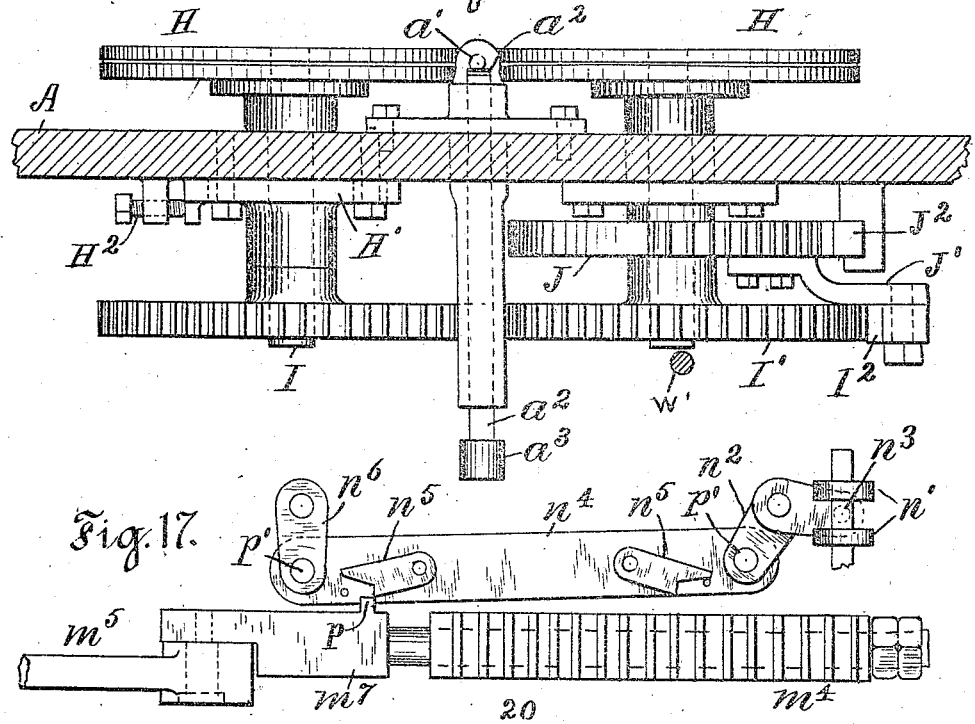
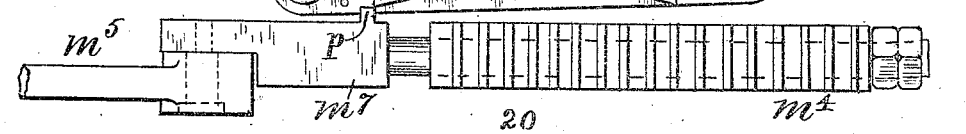
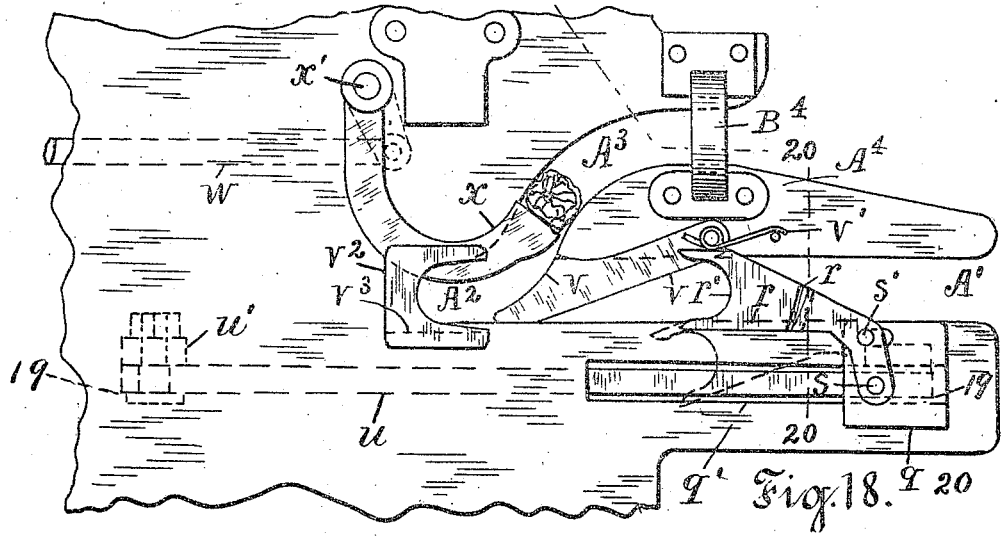

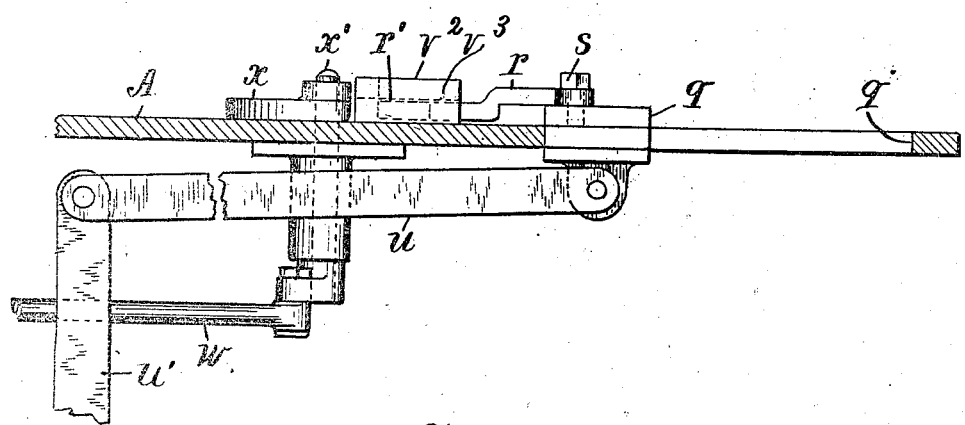
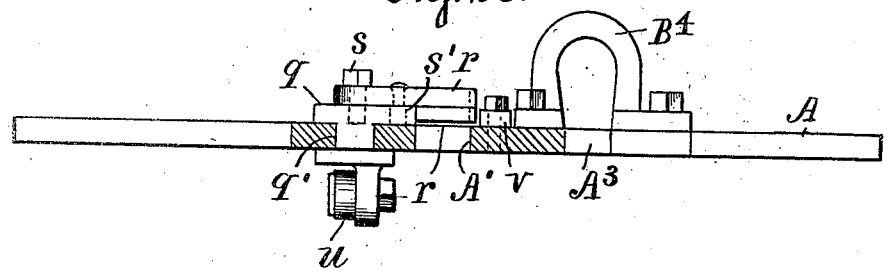
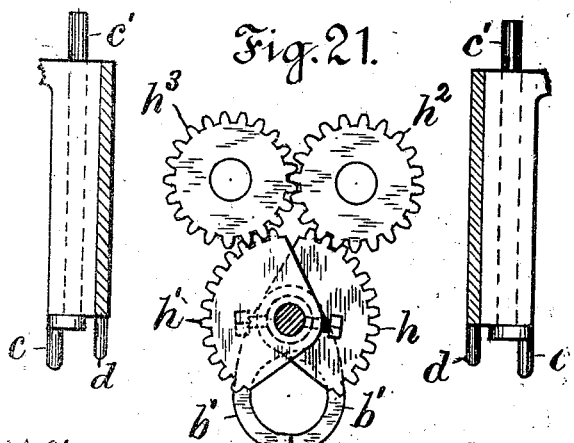

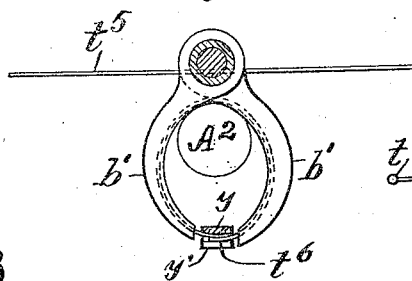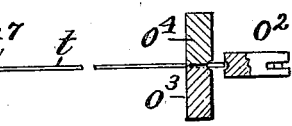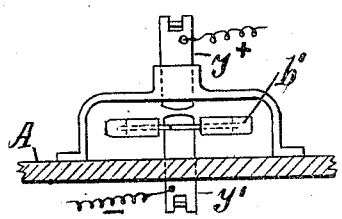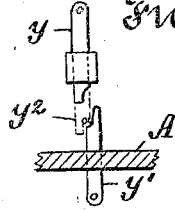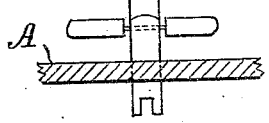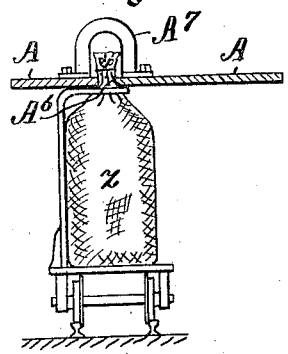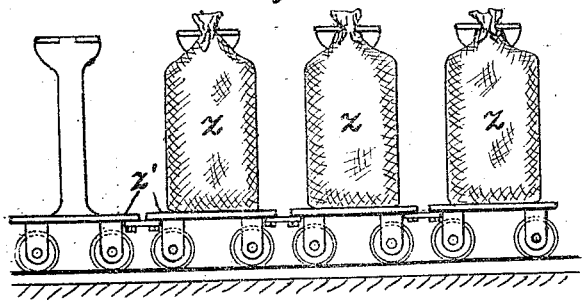

JAMES S. SLOSSON, OF NEW BRIGHTON, NEW YORK, ASSIGNOR TO CLIFFORD L. MILLER & CO., OF NEW YORK, N. Y.

MEANS FOR MAKING AND APPLYING WIRE TIES.

1,092,179.  Specification of Letters Patent.  Patented Apr. 7, 1914.

Application filed February 12, 1913. Serial No. 747,831.

*To all whom it may concern:*

Be it known that I, JAMES S. SLOSSON, a citizen of the United States, residing at New Brighton, borough of Richmond, and State of New York, have invented certain new and useful Improvements in Means for Making and Applying Wire Ties, fully described and represented in the following specification and the accompanying drawings, forming a part of the same.

The object of this invention is to facilitate the application of wire-ties to bags or other articles and the twisting of the ends of the tie together to close and fasten the article.

Heretofore, wire-ties have been made in quantities and fed successively to mechanism adapted for tying them upon the neck of the bag; but the necessity of feeding such separate ties involves a great deal of complication in the machine, and to avoid such complication in the present construction, means is provided for feeding a wire to the machine and making the tie adjacent to the article upon which it is to be twisted, and applying it immediately to the article, thus avoiding the handling of the tie to any material extent after it is made.

The invention thus comprises in a single organization, means for supporting the article to be tied; means for making a wire-tie adjacent such article; means for applying the tie to the article, and means for twisting the ends of the tie together, all of the said means being connected to operate automatically in succession, so that the tying of bags is continuous so long as the bags and the wire are supplied to the machine.

It is immaterial whether the wire-tie be formed in close proximity to the neck of the bag, and the term "adjacent" herein must be construed to include the manufacture of the tie anywhere in the same machine where it is applied to the article and secured thereon. In such a machine, the bags or other articles may be fed to the machine successively by hand, or they may be delivered to the machine by a suitable feeder or carrier.

The invention includes means for making a wire-tie from a blank by folding over the ends for a considerable distance and laying the terminals of the wire parallel with the body of the tie, so that when the ends of the tie are twisted together the coils are formed of four wires instead of two. The folding over of the ends thus forms a stronger twist to hold the tie in place, while the twist of the terminals upon the neck of the bag projects them toward the neck of the bag so that they cannot project to injure the fingers in untwisting the tie.

The invention will be understood by reference to the annexed drawing, in which—

Figure 1 is a plan of a machine embodying the invention; Fig. 2 is a side elevation of the same with the nearer side of the frame broken away; Fig. 3 is a section, where hatched, on line 3—3 in Fig. 1; Fig. 4 is a side view of the twister-spindle; Fig. 5 is an end view of the same showing the tie-clamping-jaws; Fig. 6 is a plan of the clamping-jaws with the adjacent parts that coöperate in holding the tie during the twisting operation; Fig. 6$^a$ shows the front end of the bending-arms; Fig. 7 is a front view of the tie-bending devices with the ends of the wire folded over; Fig. 8 is a plan of the rack for operating the twister; Fig. 9 is an elevation of the same with the gearing for operating the twister, taken in section on line 9—9 in Fig. 3; Fig. 10 is a front elevation of the wire-bending devices and bag-neck closer; Fig. 11 is a front elevation of the blank-holder upon a larger scale than that shown in Fig. 10; Fig. 12 is a plan of the same; Fig. 13 is a plan of the same on the same scale as Fig. 10, with the adjacent parts for closing the bag and twisting the tie, the jaws of the twister being omitted. Fig. 14 is a cross-section of the blank-holder at the middle-line of Fig. 10; Fig. 15 shows one of the ties as when twisted upon the bag-neck; Fig. 16 is an elevation on line 16—16 in Fig. 1; Fig. 17 is a plan of the device for closing the twister-jaws; Fig. 18 is a plan of one end of the machine-bed with the bag-chute and the fixtures for moving the bag therein; Fig. 19 is a section on line 19—19 in Fig. 18; Fig. 20 is a section on line 20—20 in Fig. 18; Fig. 21 is a plan of the means for actuating the bending-arms for the bag-neck, the view also including the crank-shafts $c'$ and their bearings; Fig. 22 shows the bending of a tie for electrical welding; Fig. 23 shows the tools for electrical welding, viewing the front ends of the bending-arms; Fig. 24 is an edge view of the tools for welding, before their actuation; Fig. 25 shows the tools engaged with one another upon the wire ends; Fig. 26 shows the ring of wire twisted upon a bag-neck; Fig. 27 shows the end of the tool for twisting such ring; Fig. 28 is a diagram showing means for unsetting the ends of the wire; Fig. 29 shows means of moving filled bags to the tying devices; and Fig. 30 is a cross-section of the bed in connection with such tying devices.

The invention will first be described in its preferred form, and several modifications then referred to.

In Figs. 1 and 2, A designates a flat bed-plate or table supported upon a frame having legs B and bearings C and D for the driving-shaft E and cam-shaft F. The driving-shaft would, in practice, be propelled by any suitable means. The table is provided at one end with a chute A' leading to a socket A² which forms the holder for the bags during the tying operation. The means for making the wire-tie are shown in Fig. 1 directly beneath the socket A², and also two bending-arms b' adapted to embrace the opposite sides of the bag-neck and at the same time bend the newly formed tie around the bag-neck; and upon the opposite side of the socket the twister-jaws C' are located, as shown in Fig. 1.

*Wire-feeding device.*—The wire a is fed through a straightener B to feed-wheels H having shafts I connected by gears I' beneath the table. A cog-wheel J is fitted to turn loosely upon one of the shafts I, as shown in Fig. 16, and provided with an arm J' having a pawl I² to engage the adjacent wheel I'. A rack J² meshes with the cog-wheel J and is reciprocated by connections J⁴ to a cam J³ upon the shaft E. During the feeding of the wire, the pawl turns the feed-wheels H through the required space, and slips over the teeth of the gear I' in its reverse movement. Fig. 16 shows the bearing H' of one of the shafts I bolted adjustably to the table A, and provided with an adjusting screw H² to press the wheels H together upon the wire for feeding the same. A cutter-sleeve a' is mounted upon the table at the delivery side of the feed-wheels, and the wire passes through the same and is severed at the proper time by a cutter a² moved by lever-connections a³ to a cam a⁴.

*Wire-bending devices.*—The wire-blank before it is severed from the wire is moved through a blank-holder shown in Figs. 10 to 13, and passes over two fingers b upon the bending-arms b'. Near the opposite ends of the tie, bending-cranks are located having crank-pins c over which the wire passes, and it also passes beneath adjacent studs d over which the wire may be looped by the crank-pins c, as shown in Fig. 7, to form loops t' upon the tie t. To feed the wire into its proper position, a guide-box is located between the cranks and formed with a bed f, guide-blocks f', and hinged flaps f² at the side of the guide-blocks between which and the guide-blocks the wire passes, as shown in Fig. 12. The ends of the blocks and the flap next the cutter a² are flared to admit the wire easily. The flaps are held normally upward by springs f³, and a spring-finger f⁴ extends over the top of the wire between the two flaps, as shown in Figs. 12 and 14, and is sloped upon its under side so that the wire can be drawn out from between the same, as shown in dotted lines t in Fig. 13. When the ends of the wire are bent forwardly by the bending-arms, the flaps f² are thrown downward by the wire, as shown in Figs. 13 and 14. The crank-shafts c' are connected by bevel-gears c² and a shaft c³ which is shown grooved spirally, and a nut c⁴ actuated, as shown in Figs. 1 and 2, by connections c⁵ to a cam c⁶, which oscillates the crank-pins c.

*Tie-closing device.*—The bending-arms b' are shown retracted in Figs. 1 and 10, and in Figs. 6 and 13 extended forward in the act of bending the tie. The arms are mounted respectively upon a concentric shaft g and sleeve g', and are each curved toward their extremity so as to fit opposite sides of the bag-neck directly above the socket A² in the table, and the ends of the arms are formed with notches e, as shown in Figs. 6ª and 10, to form, when the arms are closed as in Figs. 6 and 6ª, a die within which the ends of the tie are twisted together forming interlaid coils t², as shown in Fig. 15. The shaft g and sleeve g' are provided respectively with toothed sectors h and h', which mesh respectively with pinions h² and h³. These pinions overlap for a portion of their length so that they rotate in opposite directions, and move the bending-arms from opposite directions toward the bag-neck in the socket A².

One of the pinions has a shaft i extended downward through the table and provided at its lower end with a pinion j which is operated by means of a rack k and connections k' to a cam k². By this construction, the bending-arms operate when the tie is finished to bend it immediately about the neck of the bag to be grasped by the twisting jaws C'. These jaws, as shown in Figs. 4 to 6 inclusive, and Fig. 3, are pivoted at opposite sides of a head l which is terminated in front by a wedge l' to the tapering sides of which the looped ends t' of the tie are pressed, as shown in Figs. 6 and 13, when the bending-arms are fully closed upon the bag-neck. The jaws have an aperture in the center to clear the tapering sides of the wedge, and are shown in Fig. 4 in their open position adapted to receive the ends of the wire-ties in whatever direction the loops t' may extend. One of such ties t is shown inserted in the jaws in readiness to be gripped. The head $l$ is carried by a twister-spindle $m$ through which a jaw-closing rod $n$ is movable and formed at its front end with a wedge, as shown in Figs. 3 and 4, adapted to expand tail-pieces $C^2$ which are projected from the rear ends of the jaws through slots $C^3$ in the head $l$. Each of the jaws has a spring $o$ resting upon the pin $o'$ upon the edge, to hold the jaw normally open, as shown in Fig. 4. The spindle $m$ is provided with a pinion $m'$ at its rear end meshing with a gear $m^2$ which is rotated by a gear $m^3$ and a rack $m^4$ having suitable connections $m^5$ to a cam $m^6$. The connections to the rack $m^4$ are constructed, as shown in Figs. 1, 3, 8, 9 and 17, to suitably reciprocate the rod $n$ before the spindle $m$ is rotated, and thus secure the closing of the jaws upon the end of the wire-tie before the jaws are rotated. This is effected by mounting the rack $m^4$ movably upon a stem $m^7$ with adjusting nuts $m^8$ at one end. The closing-rod $n$ is formed with collars $n'$ and a bell-crank $n^2$ has a crank-pin $n^3$ fitted between the collars and is connected to a link $n^4$ having dogs $n^5$ to alternately engage a stud $p$ movable with the stem $m^7$. The dogs $n^5$ are pivoted upon the link $n^4$ and provided with shoulders facing in opposite directions and rest upon stops upon the link to hold the shoulders a little below the stops.

A crank-arm $n^6$ is jointed to the table A to hold one end of the link movable, and is made of the same radius as the bell-crank-arm $n^2$, but the supports of these two crank-arms are set farther apart than their pivots $p'$ upon the link which causes each one of them to swing the adjacent dog out of the path of the stud $p$ after the link has been moved a short distance by the stud. At the beginning of its movement, the nuts $m^8$ clear the end of the rack sufficiently as shown in Fig. 9, to permit the required movement of the stud $p$ and the link $m^4$, to move the closing-rod $n$ endwise and thus close the jaws before the nuts touch the end of the rack, as shown in Figs. 8 and 17, and move the rack to rotate the spindle $m$. The dogs $n^5$ operate at opposite ends of the rack's movement to close the jaws $C'$, the rack $m^4$ then rotates the head $m$ with the jaws to twist the ends of the tie together, and the dogs finally reverse the motion of the link $m^4$ and retract the closing-rod to open the jaws, to release the twisted tie.

*Bag-feeding device.*—The socket $A^2$ is closed during the bag-tying operation at the inner end of the chute $A'$, by the forked end of a pusher-arm $r$, as shown in Fig. 1. For want of room upon Fig. 1 of the drawing, parts of the bag-feeding devices are broken off, but they are fully shown in Figs. 18, 19 and 20. A carrier $q$ is fitted to reciprocate in a slot $q'$ at one side of the chute $A'$, and has pivoted upon it a pusher-arm $r$ with fork $r'$ adapted to embrace the neck of a bag and push it into socket $A^2$. The arm $r$ is jointed upon the carrier and is allowed (by a slot and pin $s'$) to have a limited movement upon its pivot $s$ so as to swing clear of the chute in its outward movement by the side of the same, as shown in Fig. 18, and also inwardly across the chute, when moved toward the socket $A^2$, as shown in Fig. 1. The carrier is connected by a link $u$ and lever-arm $u'$ with a cam $u^2$, which in moving the carrier outwardly throws the pusher-arm automatically into its inoperative position, and automatically throws it across the chute when the motion of the carrier is reversed, (see Figs. 18 and 19). When the carrier is moving outwardly, the neck of a bag may therefore be inserted by hand or by any other suitable means, far enough within the chute $A'$ to be engaged by the forked end of the pusher upon its reverse movement and carried to the socket by the pusher, which serves to hold it during the tying operation. An outlet channel $A^3$ is extended from the socket $A^2$ to the side of the table to discharge the tied bag-necks from the socket, and an isolated portion or island $A^4$ of the table is thus separated therefrom and is held in its required position by an arch $B^4$, (Fig. 18). A switch-point $v$ is mounted upon the island $A^4$ adjacent to the socket $A^2$, as shown in Fig. 18, to close the chute $A'$, when discharging the tied bag-neck into the outlet. The switch-point is pressed normally across the chute $A'$ by a spring $v'$, and the bag-pusher $r$ when moved toward the socket $A^2$ pushes the switch-point automatically to one side.

*Ejector for tied bags.*—An ejector $x$ is journaled upon an upright shaft $x'$ at one side of the twister, and is constructed to swing across the socket $A^2$ to push the tied bag-neck into the outlet. The ejector is shown in its inoperative position in Fig. 1 and in its operative position in Fig. 18, and is oscillated when required, by connections $w$ to a cam-lever $w'$, the cam for which is not shown in Fig. 2, as it would confuse the drawing. Figs. 3, 10 and 19 show a block $v^2$ at one side of the socket $A^2$ and hollowed to support the bag-neck close to the bending-arms $b'$, the under side of the block having a notch $v^3$ to clear the bag-pusher and the ejector, which move alternately into such notch. The fork $r'$ of the pusher-arm lies close to the table A (see Fig. 19) so as to enter the notch $v^3$ and clamp the bag-neck in conjunction with the block $b^2$ and the notch in the table beneath.

*Operation of machine with above attachments.*—The cutter $a^2$ is set, by adjustment of the bearing $h'$, at a suitable distance from the nearest bearing-pin $d$, and a wire of the requisite length, as indicated in Fig. 10, is fed under the studs $d$ and through the guide-box and severed at the end of the cutter-sleeve $a'$. The crank-shafts $c'$ are then rotated toward one another, folding over the ends $t^2$ of the blank, as shown in Fig. 7. Blocks $t^4$ are located beneath the studs, upon the inner sides of the same to support the wire during such bearing operation; and the folding of the wire around the studs produces the loops $t'$ at the ends of the tie which form wide eyes to which the fingers are more readily applied after the tie is twisted, as shown in Fig. 15. During the feeding and bending of the wire the bag-pusher $r$ is moved toward the socket $A^2$, thus carrying into the socket a bag-neck placed in the chute $A'$, the end of the pusher entering the notch $v^3$ in the block $v^2$ and serving to close one side of the notch during the tying operation.

Prior to its movement, the bag-pusher lies flush with the side of the chute $A'$, so that a bag-neck can be pushed into the same in contact with the switch-point $v$, so that the forward movement of the bag-pusher will engage the bag-neck and operate to push the switch-point out of the way as the bag-neck is carried into the notch. The pusher thus holds the switch-point across the outlet-channel $A^3$ during the bag-tying operation, but permits the switch under the influence of the spring $v'$ to move again across the chute $A'$ when the bag-pusher is retracted. The bending-arms $b'$ are then thrown forward, the fingers $b$ catching beneath the wire and supporting it as it is bent around the bag-neck; the middle of the wire being retained in the guide-box by the spring $f^4$ during the first portion of the bending movement and then yielding to permit the wire to be folded around the bag-neck, as indicated in Figs. 6 and 13. The bending-arms carry the ends of the tie against the sides of the wedge $l'$ of the twister, thus throwing them between the jaws $C'$ and holding the eyes upon the ends of the tie separated during the twisting operation. The first movement of the rod $m^7$ by the operation of the stud $p$ upon the dog $n^5$ then forces the jaw-closing rod $n$ between the tail-pieces of the jaws, closing the jaws upon the ends of the tie; and the rack $m^4$ is then moved to twist the spindle $m$ and twist the neck of the tie as shown at $t^3$ in Fig. 15. The bending-arms are held closed, as shown in Figs. 6 and 13, during such twisting operation, the wires forming the neck of the tie being confined in the notches $e$ which form a die to shape the neck of the tie as it is twisted. The bending-arms are then retracted to the position shown in Figs. 1 and 10, and the bag-pusher $r$ retracted to the position shown in dotted lines $r$ in Fig. 18, which releases the bag-neck so that it can be ejected from the notch $A^2$. The ejector $x$ is then operated, pushing the bag from the notch into the outlet-channel $A^3$, the switch-point $v$ guiding the tied bag-neck into the channel during such ejecting movement. The ejector immediately returns to its normal position clear of the notch $A^2$, as shown in Fig. 1, and the cycle of movements is again repeated.

By the operation described, the wire-blank is cut from a continuous wire and formed into a tie adjacent to the socket in which the bag-neck is held, thus permitting the tie to be bent immediately about the bag-neck and twisted thereon.

The formation of a tie from a continuous wire in the same machine where it is applied to the neck of the bag would in any case permit a single tie to be readily shifted into position for looping and twisting about the neck of a bag, with much less mechanism and consequent complication than where previously made ties are supplied in large numbers to the machine and require to be fed successively to the bag-neck.

The particular character of the tie made in the same machine where it is used is immaterial, as the essential feature of the invention is the making of the wire-tie in the same machine in which it is applied to and secured upon the article to be fastened.

The tie when the blank is cut from the wire, may be finished or shaped in any manner suitable to the purpose for which it is to be used, and it is not therefor an essential part of the present invention that the ends of the tie should be folded or formed with eyes. Such a form of tie does however furnish ends which are guarded by the fold, and are thus particularly suited to avoid injury to the fingers in unfastening the tie, and claim is therefore made herein to the particular device for making such a tie.

The extending of the terminals of the wire along the body of the tie produces quadruple coils with the ends of the wire projecting toward the bag-neck, thus uniting the ends of the tie very securely, while it incloses the ends of the wire where they cannot injure the fingers or catch in any object.

To illustrate the scope of the invention, Figs. 22 to 26 inclusive show means for making a ring-tie by making the blank $t^5$ long enough, as shown in Fig. 22, to extend, when folded, beyond the bag-neck with the ends $t^6$ slightly overlapped, so that they may be welded by movable electrodes $y$ and $y'$. The electrodes are shown in Figs. 23 and 24 in the position occupied during the bending of the wire; and Fig. 25 shows the electrodes closed upon the wire to weld the ends, as indicated in Fig. 25, and by the dotted lines $y^2$ in Fig. 24. The electrodes are withdrawn upwardly and downwardly when the welding is finished to permit the twisting of the loop by applying a twisting hook $y^3$ shown in Fig. 27 to one side of the wire-ring $t^8$ and twisting it upon the bag-neck, as shown in Fig. 26.

Fig. 28 is a diagram showing clamping dies $o^3$ and $o^4$ for holding the end of a wire-tie while upset or enlarged upon the end by a tool $o^2$, thus producing a rounded end $i^7$ upon the tie. Such ties with enlarged or bent ends may be twisted by using a suitable twisting tool. It is therefore immaterial to this invention what form of tie be made in the machine where it is applied to the bag-neck, or what means be employed to secure it thereon. It is also immaterial whether the operation of guarding the ties upon their ends by bending or upsetting be performed before or after the tie is folded around the bag-neck or its ends twisted together, as obvious modifications of the machinery would permit the bending or upsetting of the wire at any stage of its application to the bag-neck.

The various attachments of the machine can be disposed upon the bed-plate so that it may be divided transversely, so that bag-necks may be passed entirely through or across the same, thus permitting filled bags $z$, shown in Fig. 29, to be supported upon trucks $z'$ and propelled intermittingly into a channel $A^6$ in the table A where they would be tied, as described herein. The two halves of the frame at opposite sides of the passage $A^6$ are shown connected together by arches $A^7$.

Having thus set forth the nature of the invention what is claimed herein is:

1. A machine for making and applying wire-ties, comprising in a single organization means for supporting an article, means for making a wire-tie adjacent to such article, means for applying the tie to the article and crossing the ends of the tie, and means for twisting the ends of the tie together, all the said means being connected to operate successively, as and for the purpose set forth.

2. The combination, in a single organization, of means for feeding a continuous wire, means for cutting off lengths of wire and making individual wire-ties, means for applying one of such ties to the bag or other article to be tied, means for securing the ends of the tie together, and mechanism connecting all of the said means for operating them in succession.

3. The combination in a single organization, of means for feeding a continuous wire, means for cutting off lengths of the wire suitable for wire-ties, means for folding over the ends of the cut wire to form guarded ends on the tie, means for applying the ties to the bag or other article to be tied, and means for securing the guarded ends of the tie together.

4. The combination in a single organization, of means for feeding a continuous wire, means for cutting off lengths of the wire suitable for wire-ties, means for treating the ends of the cut wire to form guards on the tie, means for looping the tie around the article to be tied, and means for twisting the ends of the tie together and leaving the guarded ends separated for untwisting the tie.

5. The combination in a single organization, of means for feeding a continuous wire, means for cutting off lengths of the wire suitable for wire-ties, means for folding over the ends of the cut wire and forming eyes at the folds, means for looping the tie around the article to be tied, and means for twisting the ends of the tie together and leaving the eyes separated for untwisting the tie.

6. The combination in a single organization, of means for feeding a continuous wire, means for cutting off lengths of the wire suitable for wire-ties, means for folding over the ends of the cut wire and forming eyes at the folds, and laying the terminals of the wire parallel with the body of the tie, means for looping the tie around the article to be tied, and means for twisting the ends together, whereby the body and the terminals form quadruple coils.

7. The combination in a single organization, of means for feeding a continuous wire, means for cutting off lengths of the wire suitable for wire-ties, means for folding over the ends of the cut wire and forming eyes at the folds, and laying the terminals of the wire parallel with the body of the tie, means for looping the tie around the article to be tied, and means for twisting the ends together in quadruple coils with the eyes separated for untwisting the tie, and the extremities of the wire in the said coils directed toward the article.

8. The combination in a machine for making and applying wire-ties, of means for feeding a wire intermittingly with a suitable length applied to two bending-fingers, means for severing the blank from the wire, means for actuating the fingers to fold over the ends of the blank, means for applying the tie thus formed to the article to be tied, and means for twisting the ends of the tie together.

9. The combination in a machine for making and applying wire ties, of two bending-fingers to bend the ends of a wire blank, means for feeding a wire intermittingly with a suitable length applied to the bending-fingers, means for severing the blank from the wire, means for actuating the fingers and forming eyes upon the ends of the blank and laying the terminals of the wire parallel with the body of the wire, means for applying the tie thus formed to an article to be tied, and means for twisting the body-portion and terminals together in quadruple coils, with the eyes projecting at the outer end of the coils.

10. In a machine for making and applying wire-ties, the combination, with a holder for the article, of means for feeding a wire intermittingly adjacent to the article, means for cutting off the portion fed, means for folding and securing such portion about the article to be tied, and means for discharging the article from the holder.

11. In a machine for making and applying wire-ties, the combination, with a holder for a bag-neck, of means for necking-up the bag and moving it into the said holder and supporting it therein during the tying operation, means for making a wire-tie adjacent to the bag-neck with guarded ends upon the said tie, means for looping the tie about the bag-neck, and means for twisting the ends together with the guarded portions separated to facilitate untwisting.

12. In a machine for making and applying wire-ties, the combination, with a holder for the back-neck, of a device for forming a tie adjacent to such holder, a wire-feeder feeding a continuous wire to such tie-forming device, a cutter for the wire adjustable to and from the tie-forming device to vary the length of the tie-blanks, and means for looping the tie when formed about the bag-neck, and securing it thereon.

13. In a machine for making and applying wire-ties, the combination, with a holder for a bag-neck, of means for feeding a continuous wire and cutting a tie therefrom, bending-arms curved to embrace the neck of the bag and having opposed notches in their ends to form a twisting-die, means for actuating such arms, and a twister having jaws to grasp the ends of the tie and means to spread such ends apart to facilitate untwisting.

14. In a machine for making and applying wire-ties, the combination, with means for feeding a continuous wire and cutting a tie therefrom, of a holder for a bag-neck, means for folding the tie about the neck of the bag and crossing the ends of the tie, and a twister operated to twist the tie thereon.

15. In a machine for making and applying wire-ties, the combination, with means for feeding a continuous wire and cutting a tie therefrom, of a holder for a bag-neck, a twister-spindle directed toward the same and having movable jaws upon the ends, means for folding the tie about the neck of the bag, means for first closing the jaws upon the ends of the tie, and then rotating the twister-spindle, and finally opening the said jaws to release the said ends.

16. In a machine for making and applying wire-ties, the combination, with means for feeding a continuous wire and forming a tie therefrom, of a bag-neck-support having a socket to receive the bag-neck, a chute extending into the said socket, a bag-pusher with means for reciprocating it over the chute when feeding the bag to the socket, and means for looping the tie about the bag-neck and twisting it thereon when held in the socket.

17. In a machine for making and applying wire-ties, the combination, with means for feeding a continuous wire and forming a tie therefrom, of a bag-neck-support having a socket to receive the bag-neck, a chute extending into the socket, a bag-pusher with means for reciprocating it over the chute when feeding the bag to the socket and for automatically moving it to the side of the chute when retracted from the socket, and means for looping the tie about the bag-neck and twisting it thereon when held in the socket.

18. In a machine for making and applying wire-ties, the combination, with means for feeding a continuous wire and forming a tie therefrom, of a bag-neck-support having a socket to receive the bag-neck, a chute extending into the said socket, and an ejector operating to move the bag-neck from the socket.

19. In a machine for making and forming wire-ties, the combination, with means for feeding a continuous wire and forming a tie therefrom, of a bag-neck-support having a socket to receive the bag-neck, a chute extending into the said socket, an outlet-channel extended from the said notch, and an ejector operating to move the tied bag-neck from the socket into such outlet-channel.

20. In a machine for making and applying wire-ties, the combination, with means for feeding a continuous wire and forming a tie therefrom, of a bag-neck-support having a socket to receive the bag-neck, a chute extending into the said socket, an outlet-channel extended from the said notch, a switch-point operating to close the chute and open the outlet-channel, and an ejector operating to move the tied bag-neck from the socket into such outlet-channel.

21. The combination in a single organization, of means for feeding a continuous wire, means for cutting off lengths of the wire and forming the same into straight wire ties with the ends of such ties shaped to guard the same substantially as herein described, and mechanisms connecting all of the said means for operating them in succession.

22. The combination, in a machine for making and applying wire-ties, of means for bending the ends of the wire-ties together and crossing the ends of the tie, means for twisting the crossed ends, and mechanism connecting all of the said means for operating them automatically in succession.

23. The combination, in a machine for making and applying wire-ties, of means for bending the opposite ends of a wire-tie around the neck of a bag and crossing the ends of the wire, means for twisting the ends of the tie to clamp it on the bag-neck, and mechanism connecting all of the said means for operating them automatically in succession.

24. The combination in a machine for making and applying wire-ties, of means for forming a wire-tie, means for looping the tie around the article to be tied, and crossing the ends of the tie, means for twisting the ends of the tie together and mechanism connecting all of the said means for operating them automatically in succession.

25. The combination in a machine for making and applying wire-ties, of means for feeding lengths of the wire adjacent to the bag or other article to be tied, bending-arms operated to loop the tie around the article and cross its opposed ends, means for twisting the ends of the tie together while held by said arms and mechanism connecting all of the said means for operating them automatically in succession.

26. The combination, in a machine for making and applying wire-ties, of means for feeding lengths of the wire adjacent to the bag or other article to be tied, means for looping the ends of the tie around the article, means for twisting the ends of the tie together, and a die for holding the twisted coils in close proximity during the bending operation.

27. In a machine for making and applying wire-ties, the combination, with means for folding the tie about a bag-neck or other article, of a guide-block formed with bed $f$, spring-finger $f^4$, and hinged flaps $f^2$ arranged and operated substantially as herein set forth.

28. In a machine for making and applying wire-ties, the combination, with means for feeding a wire-blank, and means for folding the tie about the bag-neck, of a guide-box arranged in the path of the blank and having bed $f$, guide-blocks $f'$, spring-finger $f^4$ operating upon the bed between the guide-blocks, and hinged flaps $f^2$ operating at the side of the guide-blocks, the inlet end of the guide-box having the block $f'$ and the hinged flap $f^2$ flared to admit the wire blanks.

29. In a machine for making and applying wire-ties, the combination, with a bed-plate having a suitable channel in the same to receive bag-necks, of a conveyer carrying a series of filled bags and operating intermittently to move the bag-necks into the said channel, and means upon the bed-plate for forming a wire-tie for each bag-neck and for securing it thereon.

30. In a machine for making and applying wire-ties, the combination, with a bed-plate wholly divided, with a continuous channel between the two sides of the bed-plate, of a conveyer arranged and intermittently operated to convey a series of bags successively beneath the bed-plate with their necks moved intermittingly in the said channel, and means upon the bed-plate for forming a wire-tie for each bag-neck and for securing it thereon.

In testimony whereof I have hereunto set my hand in the presence of two subscribing witnesses.

JAMES S. SLOSSON.

Witnesses:
L. LEE,
THOS. S. CRANE.